(12) United States Patent
Lee (10) Patent No.: US 11,574,190 B2
(45) Date of Patent: Feb. 7, 2023

(54) METHOD AND APPARATUS FOR DETERMINING OUTPUT TOKEN

(71) Applicant: Samsung Electronics Co., Ltd., Suwon-si (KR)

(72) Inventor: Min-Joong Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 362 days.

(21) Appl. No.: 16/851,300

(22) Filed: Apr. 17, 2020

(65) Prior Publication Data

US 2021/0110259 A1    Apr. 15, 2021

(30) Foreign Application Priority Data

Oct. 15, 2019    (KR) .................. 10-2019-0127876

(51) Int. Cl.
*G06N 3/08* (2006.01)
*G06N 20/20* (2019.01)
*G06F 17/18* (2006.01)
*G06K 9/62* (2022.01)
*G06N 3/04* (2006.01)

(52) U.S. Cl.
CPC .............. *G06N 3/08* (2013.01); *G06F 17/18* (2013.01); *G06K 9/623* (2013.01); *G06K 9/6232* (2013.01); *G06N 3/0454* (2013.01); *G06N 20/20* (2019.01)

(58) Field of Classification Search
CPC ........ G06N 3/08; G06N 20/20; G06N 3/0454; G06F 17/18; G06K 9/623; G06K 9/6232
See application file for complete search history.

(56) References Cited

U.S. PATENT DOCUMENTS

| 7,020,593 | B2 | 3/2006 | Hong et al. |
| 8,554,560 | B2 | 10/2013 | Valsan |
| 8,886,579 | B2 | 11/2014 | De Sousa Webber |
| 9,159,317 | B2 | 10/2015 | Harsham et al. |
| 9,728,185 | B2 | 8/2017 | Schalkwyk et al. |
| 2017/0124447 | A1* | 5/2017 | Chang .................. G06F 40/279 |
| 2017/0263241 | A1 | 9/2017 | Zhu et al. |
| 2017/0270100 | A1 | 9/2017 | Audhkhasi et al. |

(Continued)

FOREIGN PATENT DOCUMENTS

| EP | 3 174 047 A1 | 5/2017 |
| EP | 3 654 328 A1 | 5/2020 |

(Continued)

OTHER PUBLICATIONS

Perrone et al., "When Networks Disagree: Ensemble Methods for Hybrid Neural Networks," Neural Networks for Speech and Image processing, 1992, 17 pages.

(Continued)

*Primary Examiner* — Santiago Garcia
(74) *Attorney, Agent, or Firm* — NSIP Law (57) ABSTRACT

A method for determining an output token includes predicting a first probability of each of candidate output tokens of a first model, predicting a second probability of each of the candidate output tokens of a second model interworking with the first model, adjusting the second probability of each of the candidate output tokens based on the first probability, and determining the output token among the candidate output tokens based on the first probability and the adjusted second probability.

30 Claims, 6 Drawing Sheets

(56) References Cited

U.S. PATENT DOCUMENTS

| | | | |
|---|---|---|---|
| 2017/0270929 A1 | 9/2017 | Aleksic et al. | |
| 2018/0189628 A1* | 7/2018 | Kaufmann | H04L 51/56 |
| 2018/0329879 A1* | 11/2018 | Galitsky | G06F 40/51 |
| 2020/0226214 A1* | 7/2020 | Reddekopp | G06F 16/1734 |
| 2020/0249918 A1* | 8/2020 | Svyatkovskiy | G06F 17/18 |
| 2020/0394496 A1* | 12/2020 | Lev | G06N 3/0445 |
| 2021/0034335 A1* | 2/2021 | Svyatkovskiy | G06N 3/088 |
| 2021/0073224 A1* | 3/2021 | Zhao | G06Q 30/0256 |
| 2021/0326675 A1* | 10/2021 | Oh | G06N 3/0427 |

FOREIGN PATENT DOCUMENTS

| | | |
|---|---|---|
| JP | 2008-210206 A | 9/2008 |
| JP | 5982297 B2 | 8/2016 |
| JP | 6222821 B2 | 11/2017 |
| KR | 10-2012-0048139 A | 5/2012 |
| KR | 10-2016-0066441 A | 6/2016 |
| KR | 10-2016-0083706 A | 7/2016 |
| KR | 10-2016-0133349 A | 11/2016 |
| KR | 10-2017-0022445 A | 3/2017 |
| KR | 10-2017-0063037 A | 6/2017 |

OTHER PUBLICATIONS

Kannan et al., "An analysis of incorporating an external language model into a sequence-to-sequence model," Dec. 6, 2017, Google, Inc., USA, 5 pages.

Chiu et al., "State-of-the-art speech recognition with sequence-to-sequence models," ICASSP, 2018, Google, U.S.A. 5 pages.

Kim, Suyoun, Takaaki Hori, and Shinji Watanabe. "Joint CTC-Attention Based End-To-End Speech Recognition Using Multi-Task Learning." *2017 IEEE international conference on acoustics, speech and signal processing (ICASSP)*. IEEE, 2017. (5 pages in English).

Lu, Liang, Xingxing Zhang, and Steve Renals. "On Training The Recurrent Neural Network Encoder-Decoder For Large Vocabulary End-To-End Speech Recognition." *2016 IEEE International Conference on Acoustics, Speech and Signal Processing (ICASSP)*. IEEE, 2016. (5 pages in English).

EESR dated Jan. 15, 2021 issued in counterpart European Patent Application No. 20176587.2 (10 pages in English).

* cited by examiner

METHOD AND APPARATUS FOR DETERMINING OUTPUT TOKEN

CROSS-REFERENCE TO RELATED APPLICATIONS

This application claims the benefit under 35 USC § 119(a) of Korean Patent Application No. 10-2019-0127876 filed on Oct. 15, 2019, in the Korean Intellectual Property Office, the entire disclosure of which is incorporated herein by reference for all purposes.

BACKGROUND

1. Field

The following description relates to a method and apparatus for determining an output token, and more particularly, to a method of forming an ensemble of two or more artificial neural networks.

2. Description of Related Art

An encoder-decoder artificial neural network model, which is a type of sequence-to-sequence model, has been introduced to generate an output with an undefined length after receiving a sequence with an undefined length as an input.

The sequence-to-sequence model may be used in various fields of application to output a sequence in a different domain from an input sequence. It may be mainly used for a chatbot and machine translation, for example. The chatbot may be constructed by configuring an input sequence and an output sequence as a question and an answer, respectively. In machine translation, a translator may be constructed by configuring an input sequence and an output sequence as an input sentence and a translated sentence, respectively. The sequence-to-sequence model may also be used for text summarization and speech-to-text (STT) recognition.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method of determining an output token includes predicting a first probability of each of candidate output tokens of a first model, predicting a second probability of each of the candidate output tokens of a second model interworking with the first model, adjusting the second probability of each of the candidate output tokens based on the first probability, and determining the output token among the candidate output tokens based on the first probability and the adjusted second probability.

The adjusting may include determining rankings of the candidate output tokens of the first model based on the first probability and adjusting the second probability based on the rankings.

The adjusting of the second probability based on the rankings may include adjusting the second probability using a function determined based on the rankings.

The adjusting of the second probability based on the rankings may include adjusting the second probability based on one or both of a scale coefficient and a threshold coefficient that are determined based on the rankings.

The adjusting may include determining rankings of the candidate output tokens of the first model based on the first probability, extracting target candidate output tokens for which the adjusting is to be performed from among the candidate output tokens based on the rankings, and adjusting the second probability corresponding to the extracted target candidate output tokens.

The adjusting of the second probability corresponding to the extracted target candidate output tokens may include adjusting the second probability corresponding to the extracted target candidate output tokens using a function determined based on the rankings.

The method may further include normalizing the adjusted second probability.

The normalizing may include normalizing the second probability such that a total sum of the adjusted second probability is 1.

The method may further include performing a beam search on a preset number of candidate output tokens among the candidate output tokens and normalizing the adjusted second probability while performing the beam search.

The determining of the output token may include calculating a weighted sum of the first probability and the adjusted second probability and determining, to be the output token, a candidate output token having a greatest weighted sum among the candidate output tokens.

A weight applied to the first probability may be greater than a weight applied to the second probability.

The predicting of the first probability may include predicting the first probability based on an output token previously determined by the first model and the second model. The predicting of the second probability may include predicting the second probability based on the output token previously determined by the first model.

In another general aspect, an apparatus for determining an output token includes one or more processors. The one or more processors may be configured to predict a first probability of each of candidate output tokens of a first model, predict a second probability of each of the candidate output tokens of a second model interworking with the first model, adjust the second probability of each of the candidate output tokens based on the first probability, and determine the output token among the candidate output tokens based on the first probability and the adjusted second probability.

The one or more processors may be configured to determine rankings of the candidate output tokens of the first model based on the first probability and adjust the second probability based on the rankings.

The one or more processors may be configured to adjust the second probability using a function determined based on the rankings.

The one or more processors may be configured to adjust the second probability based on one or both of a scale coefficient and a threshold coefficient that are determined based on the rankings.

The one or more processors may be configured to determine rankings of the candidate output tokens of the first model based on the first probability, extract target candidate output tokens for which the adjusting is to be performed from among the candidate output tokens based on the rankings, and adjust the second probability corresponding to the extracted target candidate output tokens.

The one or more processors may be configured to adjust the second probability corresponding to the extracted target candidate output tokens using a function determined based on the rankings.

The one or more processors may be configured to normalize the adjusted second probability.

The one or more processors may be configured to normalize the adjusted second probability such that a total sum of the adjusted second probability is 1.

The one or more processors may be configured to perform a beam search to search the candidate output tokens for a preset number of candidate output tokens and normalize the adjusted second probability while performing the beam search.

The one or more processors may be configured to calculate a weighted sum of the first probability and the adjusted second probability and determine, to be the output token, a candidate output token having a greatest weighted sum among the candidate output tokens.

A weight applied to the first probability may be greater than a weight applied to the second probability.

The one or more processors may be configured to predict the first probability based on an output token previously determined based on the first model and the second model and predict the second probability based on the output token previously determined based on the first model.

In another general aspect, an apparatus for determining an output token includes one or more processors. The one or more processors may be configured to rank candidate tokens based on first probabilities of the candidate tokens; determine a weight for each of the candidate tokens based on a ranking of each of the candidate tokens; adjust second probabilities of the candidate tokens by weighting each of the second probabilities by the respective weight; calculate a weighted sum for each of the candidate tokens based on the first probabilities and the adjusted second probabilities; and output a candidate token having a largest weighted sum.

The one or more processors may be configured to rank the candidate tokens by grouping the candidate tokens into two or more ranked groups based on the first probabilities of the candidate tokens; and determine a different weight for each of the ranked groups.

The one or more processors may be configured to determine the weight for each of the candidate tokens such that a first candidate token, which has a higher first probability than a second candidate token, has a larger weight than the second candidate token.

The one or more processors may be configured to determine the weight for each of the candidate tokens to be larger than one, one, or between zero and one based on the ranking of each of the candidate tokens.

The one or more processors may be configured to rank the candidate tokens is descending from a candidate token having a highest first probability to a candidate token having a lowest first probability.

Other features and aspects will be apparent from the following detailed description, the drawings, and the claims.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween. Likewise, similar expressions, for example, "between" and "immediately between," and "adjacent to" and "immediately adjacent to," are also to be construed in the same way. As used herein, the term "and/or" includes any one and any combination of any two or more of the associated listed items.

The terminology used herein is for describing various examples only and is not to be used to limit the disclosure. The articles "a," "an," and "the" are intended to include the plural forms as well, unless the context clearly indicates otherwise. The terms "comprises," "includes," and "has"

specify the presence of stated features, numbers, operations, members, elements, and/or combinations thereof, but do not preclude the presence or addition of one or more other features, numbers, operations, members, elements, and/or combinations thereof.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein.

Also, in the description of example embodiments, detailed description of structures or functions that are thereby known after an understanding of the disclosure of the present application will be omitted when it is deemed that such description will cause ambiguous interpretation of the example embodiments.

The following example embodiments may be embodied in various forms of products, for example, a personal computer (PC), a laptop computer, a tablet PC, a smartphone, a television (TV), a smart home appliance, an intelligent vehicle, a kiosk, and a wearable device. Hereinafter, examples will be described in detail with reference to the accompanying drawings, and like reference numerals in the drawings refer to like elements throughout.

Figure 1:
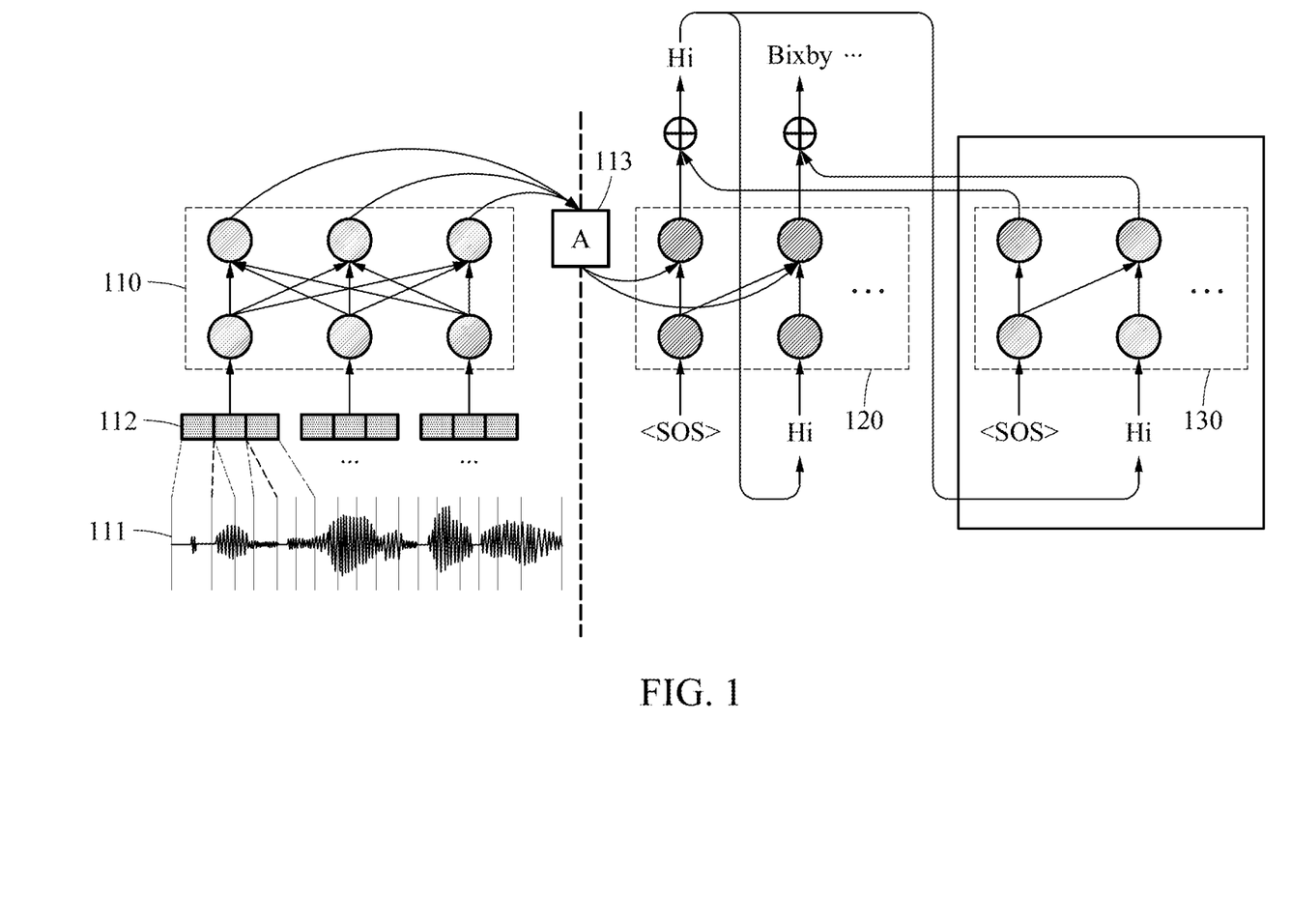
FIG. 1 is a diagram illustrating an example of an ensemble method of combining a plurality of artificial neural network models.

FIG. 1 is a diagram illustrating an example of an ensemble method of combining a plurality of artificial neural network models.

An ensemble method may be used to combine respective outputs of a plurality of models and obtain a single final output. The models described herein may include a model embodied by an artificial neural network. For example, the model may be a sequence-to-sequence model embodied by an artificial neural network.

The sequence-to-sequence model may be used in various fields of application that needs a technology for outputting a sequence of a different domain from an input sequence. The sequence-to-sequence model may include an encoder and a decoder. The encoder may receive an input sequence in sequential order, and form a single vector by compressing the entire input sequence. The single vector may be referred to as a context vector. When the input sequence is compressed into the single context vector, the encoder may transmit the context vector to the decoder. The decoder may then receive the context vector and generate an output sequence.

The sequence-to-sequence model may be mainly used for speech recognition. For example, a speech recognition model embodied in a sequence-to-sequence architecture may generate, from an input speech, a recognition result corresponding to the input speech in response to the input speech. The recognition result may be, for example, a text corresponding to the input speech. Hereinafter, an ensemble method used in such a speech recognition model embodied in the sequence-to-sequence architecture will be described as an example of the ensemble method for the convenience of description. However, examples of the model are not limited to the speech recognition model embodied in the sequence-to-sequence architecture, and various types of models or devices may be applicable and employed.

Referring to FIG. 1, the speech recognition model may include an acoustic model and a language model that are combined with each other in the speech recognition model. The speech recognition model may combine the acoustic model configured to receive speech information (e.g., a speech sequence) as an input and output a text (e.g., a word sequence) that is a recognition result, and the language model configured to predict a probability of the word sequence. The speech recognition model may thereby improve performance in speech recognition. For example, as illustrated in FIG. 1, the acoustic model includes an encoder 110 and an acoustic model decoder 120, and the language model includes a language model decoder 130. According to an example, the acoustic model may only indicate the acoustic model decoder 120.

Hereinafter, operations of the acoustic model will be described. The encoder 110 receives a speech feature vector 112 that is obtained through conversion of speech information 111 to a form of a vector corresponding to the speech information 111, without directly receiving and processing the speech information 111. The encoder 110 receives the speech feature vector 112 in sequential order, and then finally compresses all sets of the speech information 111 to generate a context vector 113. The context vector 113 may also be referred to as a feature or an encoded feature that includes the speech information 111. When the speech information 111 that is time-based information is all compressed into the single context vector 113, the encoder 110 transmits the context vector 113 to the acoustic mode decoder 120. The acoustic model decoder 120 receives the context vector 113 and outputs recognized words one by one in sequential order.

The acoustic model decoder 120 may perform autoregressive decoding. The autoregressive decoding refers to a decoding method of determining an output token based on tokens that have been recognized until a previous step for each token, and may be used to calculate an output with an undefined length by an artificial neural network.

The acoustic model decoder 120 receiving the context vector 113 receives, as an initial input, a start token SOS which indicates the start of a sentence. The acoustic model decoder 120 receiving the start token SOS predicts a token which is most likely to appear next. The term "token" used herein indicates a unit that forms a single sequence, and the unit may be a word unit, a subword unit, and a character unit. Hereinafter, a token will be described as indicating a word unit for the convenience of description. In a first time step, the acoustic model decoder 120 predicts "Hi" as a next word to appear. That is, the acoustic model decoder 120 determines "Hi" to be an output token and outputs the output token as a speech recognition result. The acoustic model decoder 120 inputs "Hi" determined to be the output token as an input for a next time step. In a second time step, the acoustic model decoder 120 predicts "Bixby" as a next word from the input word "Hi." The acoustic model decoder 120 inputs "Bixby" as an input for a next time step. The acoustic model decoder 120 may predict a next word to come as described above and input the predicted word as an input for a next time step, and repeat such predicting and inputting until an end token EOS, which indicates the end of the sentence, is predicted as a next word.

The acoustic model decoder 120 may obtain an output token based on information calculated from the encoder 110 in each step. When obtaining the output token, the acoustic model decoder 120 may obtain the output token dependent on input tokens that have been selected until a previous step. For example, when the acoustic model decoder 120 receives a token, the acoustic model decoder 120 may predict a probability of each of candidate output tokens which are candidates for the token based on the received token, and determine a final output token based on the predicted probability. In this example, the acoustic model decoder 120 may select, to be the final output token, a candidate output token having a greatest probability among the candidate output tokens.

A conditional probability of a candidate output token $t_i$ in a step i may be represented by Equation 1.

$$p(t_i|t_1,t_2,\ldots,t_{i-1},H_e) \quad \text{[Equation 1]}$$

In Equation 1, $H_e$ denotes a hidden representation of the encoder 110 and may correspond to the context vector 113. In addition, $t_1$ through $t_{i-1}$ denote tokens that have been recognized up to a current time step. The acoustic model decoder 120 may determine a next output token based on the context vector 113 and the recognized tokens.

The speech recognition model may improve performance in speech recognition by additionally using the language model that predicts a probability of a word sequence along with the acoustic model. The language model may predict a probability of an entire sentence. Before this, when previous words are given, the language model may predict a probability of a next word to come. The language model may be configured only with the language model decoder 130 without an additional encoder, and may be trained using only a text.

When there are words pronounced similarly, the language model may enable more accurate speech recognition. For example, when a word "Minchul" and a word "feels" are given, the language model may determine that a word "happy" is more likely to follow the given words than a word "habit." That is, the language model may determine that a probability of the word "happy" to follow the given words is greater than a probability of the word "habit" to follow the given words.

The acoustic model may process a relationship between a signal characteristic and a language element, for example, and estimate a pronunciation of a speech signal. The language model may estimate grammatical or semantical correctness of a word or a sentence.

The encoder 110, the acoustic model decoder 120, and the language model decoder 130 may be embodied by an artificial neural network, for example, a recurrent neural network (RNN). The encoder 110 may be an RNN configured to receive a sequence, for example, a speech, as an input. The acoustic model decoder 120 and the language model decoder 130 may be an RNN configured to output a sequence, for example, a text which is a result of speech recognition. The encoder 110, the acoustic model decoder 120, and the language model decoder 130 may also be embodied by, for example, a deep neural network (DNN) and a recurrent deep neural network (RDNN), in addition to the RNN.

The artificial neural network may include a plurality of layers each including a plurality of neurons. Neurons of neighboring layers may be connected by synapses. Through training, weights may be assigned to the synapses, and parameters may include such weights.

The layers of the artificial neural network may include an input layer, a hidden layer, and an output layer. For example, the input layer may receive an input for training or recognition and transmit the received input to the hidden layer, and the output layer may generate an output of the artificial neural network based on a signal received from neurons of the hidden layer. The hidden layer, which may be an intermediate layer between the input layer and the output layer, may change, to a predictable value, training data or target recognition data (which is a target to be recognized) that is transmitted through the input layer.

The speech recognition model may generate, from a sequence of an input speech, a sequence of a final recognition result using an ensemble of the acoustic model decoder 120 and the language model decoder 130.

The acoustic model decoder 120 and the language model decoder 130 may output respective recognition results in a token unit, and generate a final recognition result by combining the recognition results based on an ensemble weight. For example, the acoustic model decoder 120 may determine candidate output tokens based on an input speech and a previously determined recognition result, and the language model decoder 130 may determine candidate output tokens based on the previously determined recognition result. The speech recognition model may generate a final recognition result by calculating a weighted sum of a probability of each of the candidate output tokens based on a preset ensemble weight.

For example, the acoustic model decoder 120 and the language model decoder 130 may output candidate output tokens "eight" and "ate" based on previously determined output tokens "my," "number," and "is." The acoustic model decoder 120 may predict a probability of the candidate output token "eight" and a probability of the candidate output token "ate" as 0.35 and 0.4, respectively. The language model decoder 130 may predict the probability of the candidate output token "eight" and the probability of the candidate output token "ate" as 0.8 and 0.001, respectively. In this example, when an ensemble weight ratio of the acoustic model decoder 120 and the language model decoder 130 is 0.8:0.2, the candidate output token "eight" may have a final weight of 0.44 (0.8*0.35+0.2*0.8=0.44) and the candidate output token "ate" may have a final weight of 0.3202 (0.8*0.4+0.2*0.001=0.3202). Thus, the speech recognition model may determine the candidate output token "eight" having the greater weight to be a final output token.

In the ensemble method used to combine outputs of a plurality of models and obtain a single final output, a model assigned with a greatest weight when calculating a weighted sum may be referred to as a main model, and a model other than the main model may be referred to as an auxiliary model. For example, in the speech recognition model, the acoustic model may be the main model and the language model may be the auxiliary model.

In a case in which a final recognition result is generated simply based on a weighted sum of models, a desired result may not be obtained when a prediction result of the auxiliary model is not absolutely great enough to overturn a result of the weighted sum, even though the prediction result is correct. For example, in a case in which the acoustic model and the language model are trained or modeled by an artificial neural network configured to train or learn training data, such an issue described in the foregoing may be more experienced when a rare token in a context that does not appear frequently in the training data is a correct answer.

For example, when an input speech is "my favorite animal is a sloth," the acoustic model may predict, as 0.4, a probability of a word "slots" which is more commonly used and learned frequently as a correct answer because the word "slots" and the word "sloth" in the input speech are similar in pronunciation. In this example, the acoustic model may predict, as 0.306, a probability of the word "sloth" which is a correct answer (refer to Table 1 below).

TABLE 1

| y'' | $P_{ASR}$ (y''\|...) | $P_{LM}$ (y''\|...) |
|---|---|---|
| sloth | 0.306 | 0.05 |
| slots | 0.4 | 0.003 |
| ... | ... | ... |
| dog | 0.05 | 0.3 |
| cat | 0.03 | 0.24 |
| ... | ... | ... |

In contrast, by considering a portion "my favorite animal is" of the input speech, the language model may predict, as 0.05, the probability of the word "sloth" which indicates a species of animals and is a grammatically and semantically natural word or sentence. In addition, the language model may predict the probability of the word "slots" as 0.003. However, referring to Table 1, when trained or learned only with the given previous words, the language model may predict, as 0.3, a probability of a word "dog" which indicates a species of animals and is frequently seen in the training data. The predicted probability 0.3 of the word "dog" is an absolutely greater value compared to the respective probabilities of the word "sloth" and the word "slots."

In such case, the acoustic model, which is the main model, may not have a greater weight than the language model, which is the auxiliary model, and thus the word "slots" which is selected by the main model may be determined to be an ensemble result even though the language model predicts the word "sloth" as having a greater probability than the word "slots."

Thus, to solve such an issue described in the foregoing, the ensemble method may adjust a probability of candidate output tokens of the auxiliary model based on a probability of candidate output tokens of the main model, and determine a final output token by calculating a weighted sum using the adjusted probability based on the main model.

Figure 2:
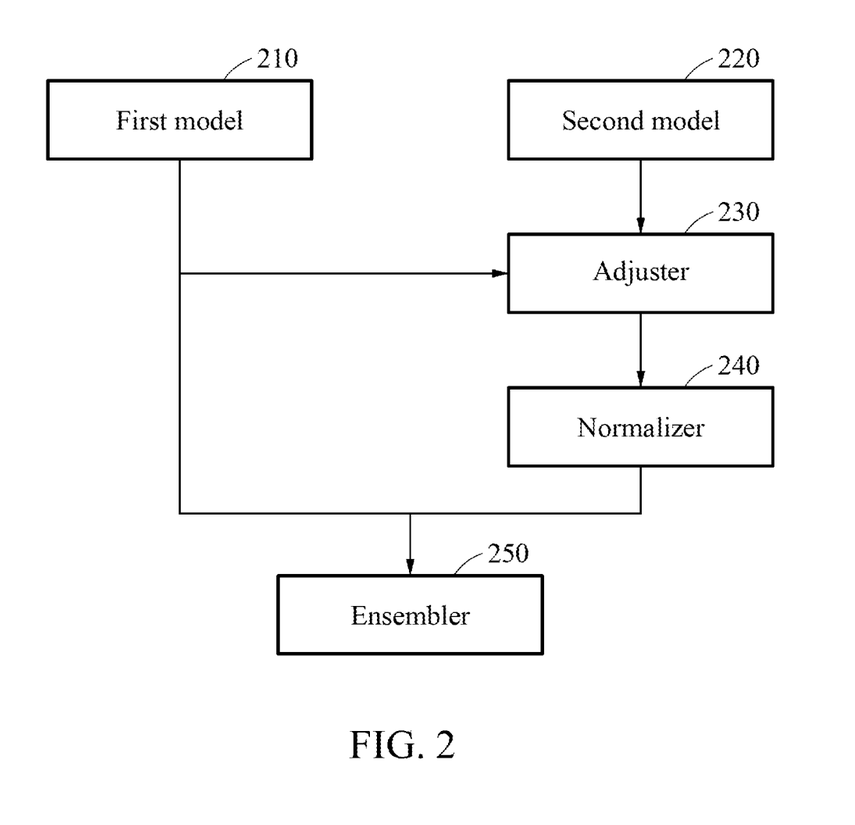
FIG. 2 is a diagram illustrating an example of an ensemble model.

FIG. 2 is a diagram illustrating an example of an ensemble model.

Referring to FIG. 2, an ensemble model includes a first model 210, a second model 220, an adjuster 230, and an ensembler 250. The ensemble model may further include a normalizer 240 according to an example.

The ensemble model may refer to an apparatus or device configured to perform the ensemble method described above with reference to FIG. 1. The ensemble model may obtain a single output by combining an output of the first model 210 and an output of the second model 220. The first model 210 may be the main model (for example, the acoustic model) described above with reference to FIG. 1, and the second model 220 may be the auxiliary model (for example, the language model) described above with reference to FIG. 1.

The adjuster 230 may readjust a predicted probability value of the second model 220 using a ranking in the first model 210. A detailed operation of the adjuster 230 will be described hereinafter with reference to FIGS. 3 through 5.

The normalizer 240 may perform normalization such that a sum of adjusted probabilities of candidate output tokens of the second model 220 is to be 1. A probability value obtained by a weighted sum may be used for another purpose in addition to a purpose of determining a final output token. For another purpose, the normalizer 240 may normalize the sum of the probabilities of the candidate output tokens to be 1, and adjust the probabilities to have a significant value. A detailed operation of the normalizer 240 will be described hereinafter with reference to FIG. 6.

Figure 3:
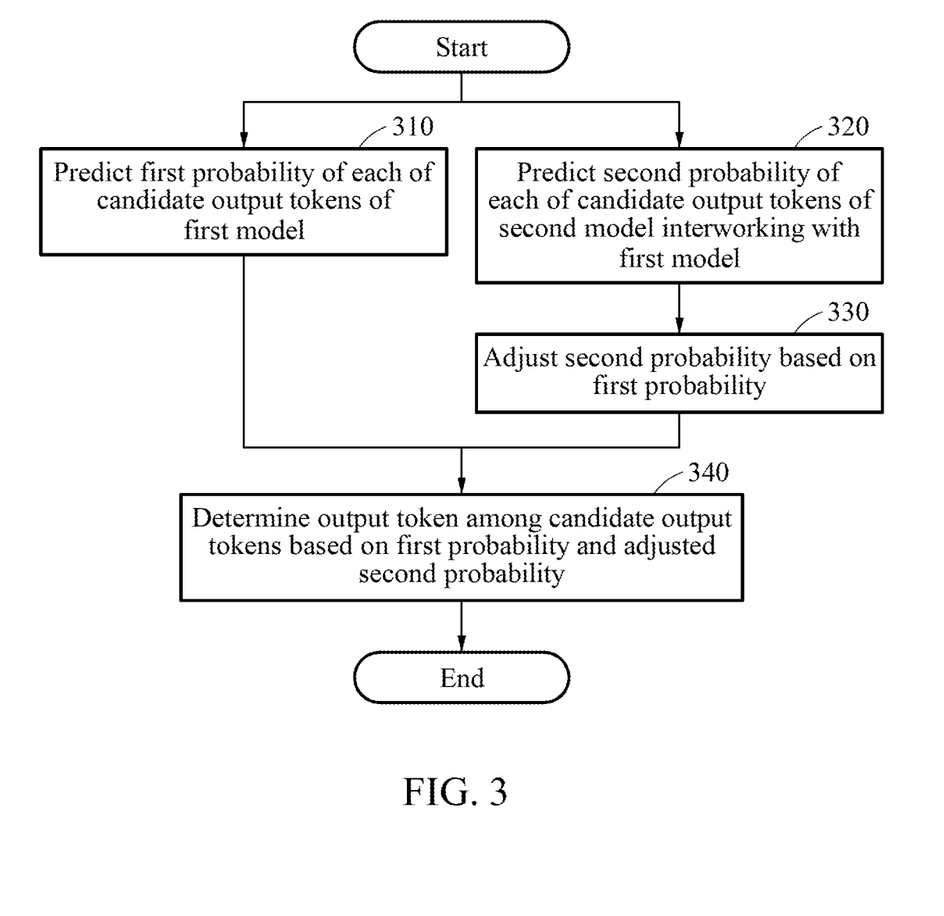
FIG. 3 is a flowchart illustrating an example of an operation of an ensemble model.

FIG. 3 is a flowchart illustrating an example of an operation of an ensemble model.

Operations 310 through 340 to be described hereinafter with reference to FIG. 3 may be performed by the ensemble model described above with reference to FIG. 2. The ensemble model may be embodied by one or more hardware models, one or more software modules, or various combinations thereof.

Referring to FIG. 3, in operation 310, a first model predicts a first probability of candidate output tokens of the first model. As described above, the first model may be the main model of the ensemble model, and be the acoustic model of the speech recognition model. The acoustic model may predict candidate output tokens, which are candidates for an output token, and predict a probability of each of the candidates.

In operation 320, a second model predicts a second probability of the candidate output tokens of the second model interworking with the first model. The second model may be the auxiliary model of the ensemble model, and be the language model of the speech recognition model. The language model may predict candidate output tokens, which are candidates for the output token, and predict a probability of each of the candidates. The acoustic model and the language model may predict the candidate output tokens based on the same candidate output token set.

In operation 330, an adjuster adjusts the second probability based on the first probability. As described above, in a case in which a final recognition result is generated simply based on a weighted sum of each of models, a desired result may not be obtained when a prediction result of the auxiliary model is not absolutely great enough to overturn a result of the weighted sum, even though the prediction result is correct. Thus, the adjuster may adjust the second probability of the candidate output tokens of the second model based on the first probability of the candidate output tokens of the first model.

For example, when an input speech is "my favorite animal is a sloth," the language model or the second model may predict a probability of a candidate "sloth" as being greater than a probability of a candidate "slots." However, such predicted probability may not absolutely great enough to overturn a result of a weighted sum calculation, and thus the candidate "slots" which is selected by the acoustic model or the first model may be determined to be an ensemble result (refer to Table 2 below).

In an example, the weighted sum calculation may include a method of calculating a weighted sum of each probability value on which the weighted sum calculation is to be performed, and a method of calculating a weighted sum of a value obtained by applying a log to each probability. Hereinafter, the method of calculating a weighted value of each probability value on which the weighted sum calculation is to be performed will be mainly described for the convenience of description.

TABLE 2

| y'' | First probability | Second probability | Weighted sum (1:0.3) | Adjusted second probability | Adjusted weighted sum (1:0.3) |
|---|---|---|---|---|---|
| sloth | 0.306 | 0.05 | 0.321 | 0.5 | 0.456 |
| slots | 0.4 | 0.003 | 0.4009 | 0.03 | 0.409 |
| ... | ... | ... | | ... | |
| dog | 0.05 | 0.3 | 0.14 | 0.03 | 0.059 |
| cat | 0.03 | 0.24 | 0.104 | 0.024 | 0.0374 |
| ... | ... | ... | | | |

To solve such an issue described in the foregoing, the adjuster may adjust a prediction value of the language model or the second model such that a final recognition result is generated from candidates, for example, top n candidates, of which probabilities are predicted highly by the acoustic model or the first model. The adjuster may readjust the second probability of the second model based on rankings of the candidate output tokens of the first model using a predefined function. Hereinafter, a method of adjusting the second probability based on the first probability will be described with reference to FIGS. 4 and 5.

Figure 4:
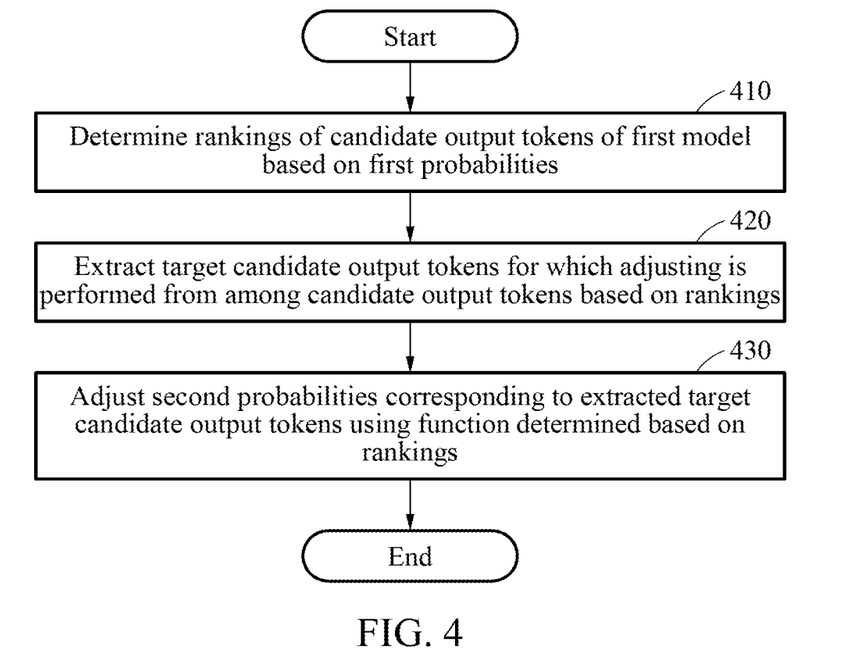
FIG. 4 is a flowchart illustrating an example of a method of adjusting a second probability based on a first probability.

FIG. 4 is a flowchart illustrating an example of a method of adjusting a second probability based on a first probability. Operations 410 through 430 to be described hereinafter with reference to FIG. 4 may be performed by the adjuster described above with reference to FIGS. 2 and 3.

Referring to FIG. 4, in operation 410, the adjuster determines rankings of candidate output tokens of a first model based on first probabilities of the candidate output tokens. The adjuster may determine the rankings of the candidate output tokens in sequential order starting from a candidate output token having a greatest first probability.

In operation 420, the adjuster extracts target candidate output tokens for which adjustment is to be performed from among the candidate output tokens based on the determined rankings. The adjuster may extract the target candidate output tokens based on a threshold coefficient determined based on the rankings. The adjuster may determine all the candidate output tokens to be the target candidate output tokens, or determine a portion of the candidate output tokens to be the target candidate output tokens. For example, the adjuster may determine top n candidate output tokens among all the candidate output tokens. Alternatively, the adjuster may determine the top n candidate output tokens and bottom n candidate output tokens among all the candidate output tokens. Alternatively, the adjuster may determine all the candidate output tokens to be the target candidate output tokens.

In operation 430, the adjuster adjusts second probabilities corresponding to the extracted target candidate output tokens using a function determined based on the rankings. The adjuster may adjust the second probabilities of the target candidate output tokens based on a scale coefficient determined based on the rankings. The function to be used in operation 430 may be embodied in various ways, for example, a linear function or a nonlinear function. For example, referring to Table 2 above, a function that boosts respective second probabilities of top n candidate output tokens by a factor of 10 times, and boosts respective second probabilities of remaining candidate output tokens by a factor of 0.1 times is used. As a result of the boosting, a second probability of a candidate "sloth" which is one of the top n candidate output tokens is increased from 0.05 to 0.5, and a second probability of a candidate "slots" which is another one of the top n candidate output tokens is increased from 0.003 to 0.03. In addition, a second probability of a candidate "dog" which is not included in the top n candidate output tokens is decreased from 0.3 to 0.03, and a second probability of a candidate "cat" which is not included in the top n candidate output tokens is decreased from 0.24 to 0.024.

Because it is highly likely that there is a correct answer among the top n candidate output tokens predicted by the first model (or main model), although they may not be completely correct, the adjuster may adjust the probabilities of the candidate output tokens of the second model (or auxiliary model) such that the top candidate output tokens predicted by the first model have sufficiently great probabilities. Hereinafter, a function that enables the top candidate output tokens predicted by the first model to have sufficiently great probabilities will be described with reference to FIG. 5.

Figure 5:
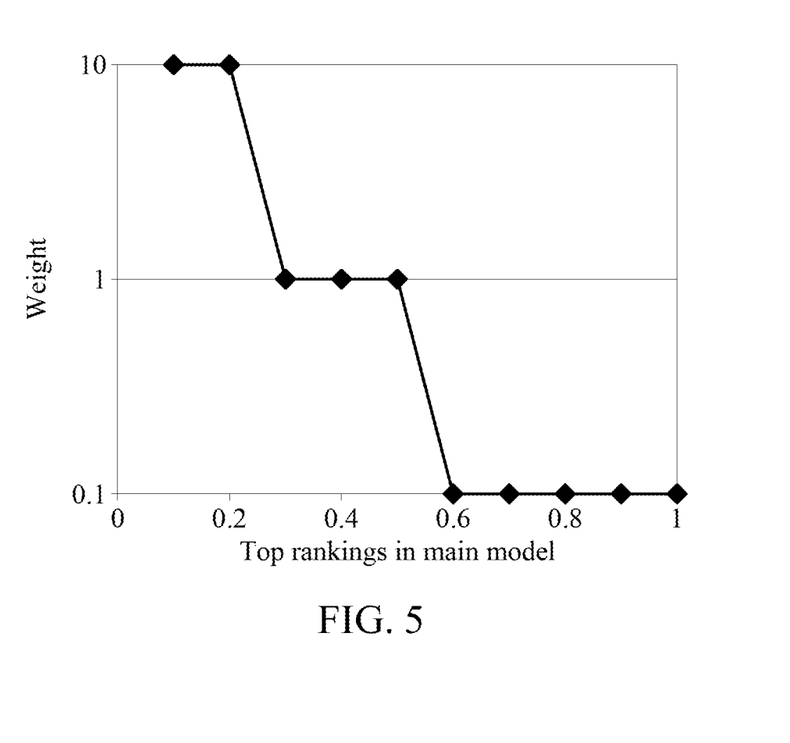
FIG. 5 is a graph illustrating an example of a function used to adjust a second probability.

FIG. 5 is a graph illustrating an example of a function used to adjust a second probability.

When a token that does not frequently appear in training data is a correct answer or a truth, prediction performance of a language model that predicts an output token based on a context and a previously output token may be degraded significantly. Meanwhile, an acoustic model may predict an output token based on input speech information, and thus may have a consistent level of prediction performance even in such a case. In an example, a function used herein may be designed to reflect such a case.

Referring to FIG. 5, a function used herein may be a function that multiplies a second probability of each of top 20% candidates in rankings determined based on a first probability by a factor of ten times, maintains a second probability of each of top 20% to 60% candidates in the rankings (factor/weight of 1, for example), and multiplies a second probability of each of top 60% to 100% in the rankings by a factor of 0.1 times.

By the function, the second probability of each of the top 20% candidates in the rankings determined based on the first probability may increase tenfold, and thus it is more likely that a final output token is determined among the top 20% candidates in the rankings. In addition, a candidate having a greatest second probability among the top 20% candidates, for example, a candidate which is most suitable for a context among candidates determined based on an input speech, may be determined to be the final output token.

Referring back to FIG. 3, in operation 340, the ensembler determines a final output token among the candidate output tokens based on the first probability and the adjusted second probability. For example, the ensembler may calculate a weighted sum of the first probability and the adjusted second probability based on a weight ratio, for example, 1:0.3. In this example, referring to Table 2 above, the ensembler may output a final weight 0.456 for a candidate "sloth" by obtaining a weighted sum of a first probability 0.306 and an adjusted second probability 0.5, and output a final weight 0.409 for a candidate "slots" by obtaining a weighted sum of a first probability 0.4 and an adjusted second probability 0.03. In this example, the ensembler may determine the candidate "sloth" having a greatest weight to be a final output token.

In a case in which a final recognition result is generated simply based on a weighted sum of each model, the candidate "slots" may be determined to be the final output token. However, the ensemble model may determine the candidate "sloth" to be the final output token by adjusting a probability of a candidate output token of an auxiliary model based on a probability of the candidate output token of a main model.

Figure 6:
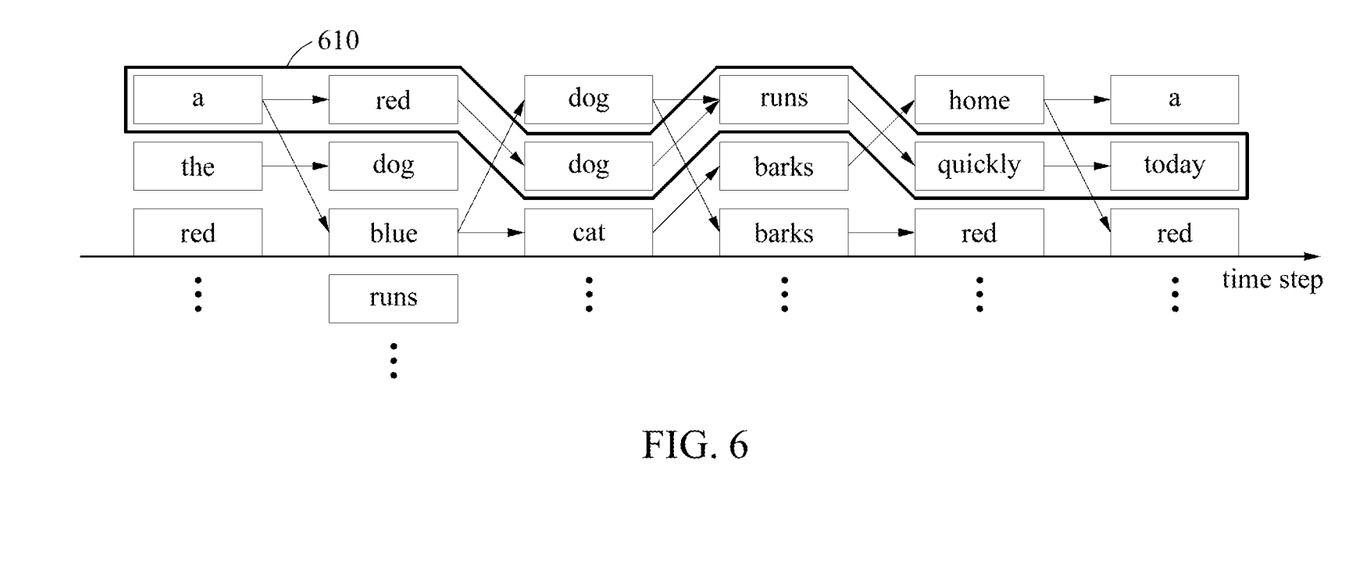
FIG. 6 is a diagram illustrating an example of normalizing an adjusted second probability.

FIG. 6 is a diagram illustrating an example of normalizing an adjusted second probability.

A normalizer may be configured to normalize an adjusted second probability such that a sum of the adjusted second probability is 1. A probability value obtained by a weighted sum may be used for another purpose in addition to a purpose of determining a final output token. The normalizer may perform normalization such that a sum of probabilities of candidate output tokens is 1, and adjust the probabilities to have significant values without simply using them to determine the final output token.

For example, in a case of a beam search, the probabilities of the candidate output tokens may not only be used to determine the final output token but also used later. The beam search may be used to compare scores of candidate sentences, and a score of an entire sentence may be modeled or trained with a multiplication of probabilities of each of tokens. When performing the modeling for the beam search, a sum of probabilities of candidate output tokens may need to be 1. Thus, for an ensembler to perform the beam search, it may need to normalize an adjusted second probability.

FIG. 6 illustrates an example of the beam search.

For example, as illustrated, words "red," "dog," "blue," and "runs" may be generated as candidate words that are likely to follow words "a," "the," and "red" in a first time step. A preset number of candidate words that is most highly likely to follow the words in the first time step may be selected in sequential order from among the generated words. For example, when the preset number is 3, the words "red," "dog," and "blue" may be selected, and the word "runs" may be eliminated.

In addition, words "dog," "dog," and "cat" may be generated as candidate words that are likely to follow the words "red," "dog," and "blue" in a second time step. A preset number of candidate words may also be selected in sequential order from among the generated candidate words.

Through the beam search as described above, a recognition result "a red dog runs quickly today" 610 may be effectively obtained without a need to search for all candidate paths.

Figure 7:
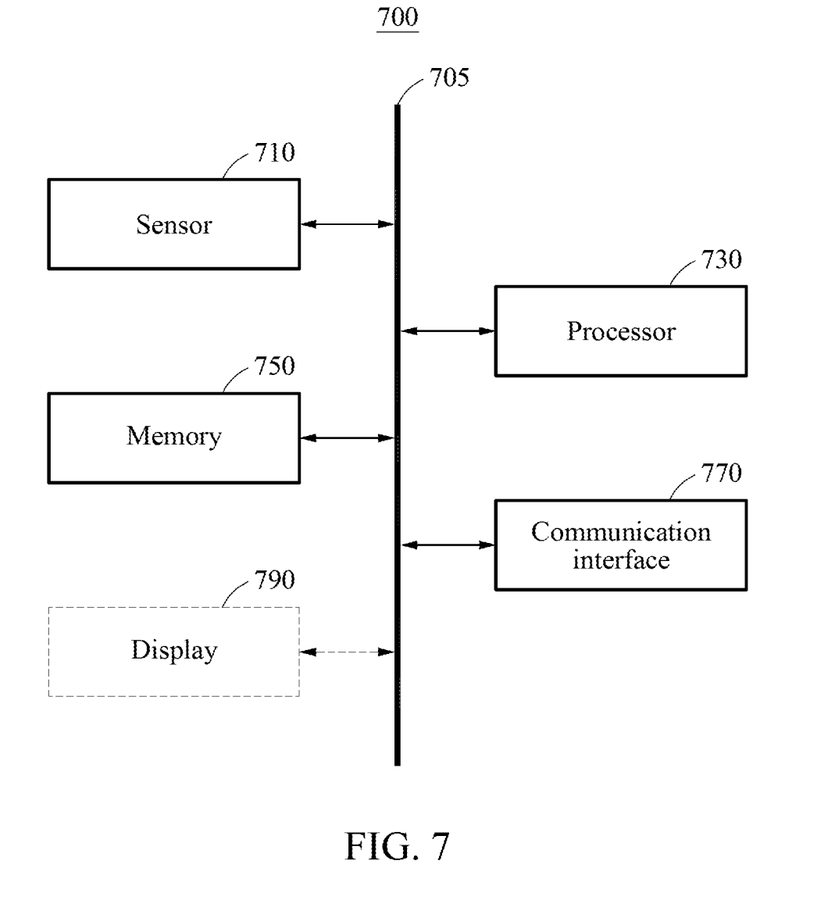
FIG. 7 is a diagram illustrating an example of an apparatus for determining an output token.

FIG. 7 is a diagram illustrating an example of an apparatus for determining an output token.

Referring to FIG. 7, an apparatus 700 for determining an output token includes a sensor(s) 710, a processor 730, and a communication interface 770. The apparatus 700 further includes a memory 750 and a display 790. The sensor 710, the processor 730, the memory 750, the communication interface 770, and the display 790 may communicate with one another though a communication bus 705. The apparatus 700 may include the ensemble model described above with reference to FIGS. 1 through 6.

The sensor 710 may include a microphone sensor and a speech or voice sensor, for example.

The processor 730 may perform one or more, or all, of the operations or methods described above with reference to FIGS. 1 through 6, and perform an algorithm corresponding to the one or more, or all, of the operations or methods. The processor 730 may execute a program and control the apparatus 700. A code of the program to be executed by the processor 730 may be stored in the memory 750.

The processor 730 may be a central processing unit (CPU) or a graphics processing unit (GPU), for example.

The processor 730 may predict a first probability of each of candidate output tokens of a first model, predict a second probability of each of the candidate output tokens of a second model, adjust the second probability based on the first probability, and determine a final output token among the candidate output tokens based on the first probability and the adjusted second probability.

The processor 730 may determine rankings of the candidate output tokens of the first model based on the first probability, and adjust the second probability based on the determined rankings. The processor 730 may adjust the second probability using a function determined based on the rankings. The processor 730 may adjust the second probability based on a scale coefficient determined based on the rankings. The processor 730 may determine the rankings of the candidate output tokens of the first model based on the first probability, extract target candidate output tokens for which the adjusting is to be performed from among the candidate output tokens based on the rankings, and adjust the second probability corresponding to the extracted target candidate output tokens based on the rankings. The processor 730 may normalize the adjusted second probability. The processor 730 may normalize the second probability such that a total sum of the adjusted second probability is to be 1. The processor 730 may calculate a weighted sum of the first probability and the adjusted second probability, and determine a candidate output token having a greatest weighted sum among the candidate output tokens to be the final output token. The processor 730 may predict the first probability based on an output token previously determined based on the first model and the second model, and predict the second probability based on the previously determined output token.

The memory 750 may store data processed by the processor 730. For example, the memory 750 may store the program. The program to be stored may be a set of syntaxes that is executable by the processor 730 by being coded to perform speech recognition. The memory 750 may be a volatile or nonvolatile memory.

The communication interface 770 may transmit and receive data by being connected to the sensor 710, the processor 730, and the memory 750. The communication interface 770 may transmit and receive data by being connected to an external device. The term "transmit and receive A" used herein may indicate "transmit and receive information or data indicating A."

The communication interface 770 may be embodied by circuitry in the apparatus 700. For example, the communication interface 770 may include an internal bus and an external bus. For another example, the communication interface 770 may be an element that connects the apparatus 700 and another external device. The communication interface 770 may receive data from the external device and transmit the received data to the processor 730 and the memory 750.

The display 790 may display a decoded result. For example, the display 790 may display a result of an output token.

The apparatus for determining an output token, and other apparatuses, units, modules, devices, and other components described herein with respect to FIGS. 2 and 7 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1 and 3-6 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A processor-implemented method of determining an output token, comprising:
   predicting a first probability of each of candidate output tokens provided from a first model;
   predicting a second probability of each of the candidate output tokens provided from a second model different from and interworking with the first model;
   adjusting the second probability of each of the candidate output tokens based on the first probability; and
   performing an inference operation including a speech recognition by determining the output token among the candidate output tokens based on the first probability and the adjusted second probability.

2. The method of claim 1, wherein the adjusting comprises:
   determining rankings of the candidate output tokens of the first model based on the first probability; and
   adjusting the second probability based on the rankings.

3. The method of claim 2, wherein the adjusting the second probability based on the rankings comprises:
   adjusting the second probability using a function determined based on the rankings.

4. The method of claim 2, wherein the adjusting the second probability based on the rankings comprises:
adjusting the second probability based on one or both of a scale coefficient and a threshold coefficient that are determined based on the rankings.

5. The method of claim 1, wherein the adjusting comprises:
determining rankings of the candidate output tokens of the first model based on the first probability;
extracting target candidate output tokens for which the adjusting is to be performed from among the candidate output tokens based on the rankings; and
adjusting the second probability corresponding to the extracted target candidate output tokens.

6. The method of claim 5, wherein the adjusting the second probability corresponding to the extracted target candidate output tokens comprises:
adjusting the second probability corresponding to the extracted target candidate output tokens using a function determined based on the rankings.

7. The method of claim 1, further comprising:
normalizing the adjusted second probability.

8. The method of claim 7, wherein the normalizing comprises:
normalizing the second probability such that a total sum of the adjusted second probability is 1.

9. The method of claim 1, further comprising:
performing a beam search on a preset number of candidate output tokens among the candidate output tokens; and
normalizing the adjusted second probability while performing the beam search.

10. The method of claim 1, wherein the determining the output token comprises:
calculating a weighted sum of the first probability and the adjusted second probability; and
determining, to be the output token, a candidate output token having a greatest weighted sum among the candidate output tokens.

11. The method of claim 7, wherein a weight applied to the first probability is greater than a weight applied to the second probability.

12. The method of claim 1, wherein the predicting the first probability comprises:
predicting the first probability based on an output token previously determined by the first model and the second model,
wherein the predicting the second probability comprises:
predicting the second probability based on the output token previously determined by the first model.

13. A non-transitory computer-readable storage medium storing instructions that, when executed by a processor, cause the processor to perform the method of claim 1.

14. An apparatus for determining an output token, comprising:
one or more processors configured to:
predict a first probability of each of candidate output tokens provided from a first model;
predict a second probability of each of the candidate output tokens provided from a second model different from and interworking with the first model;
adjust the second probability of each of the candidate output tokens based on the first probability; and
perform an inference operation including a speech recognition by determining the output token among the candidate output tokens based on the first probability and the adjusted second probability.

15. The apparatus of claim 14, wherein the one or more processors are configured to:
determine rankings of the candidate output tokens of the first model based on the first probability; and
adjust the second probability based on the rankings.

16. The apparatus of claim 15, wherein the one or more processors are configured to:
adjust the second probability using a function determined based on the rankings.

17. The apparatus of claim 15, wherein the one or more processors are configured to:
adjust the second probability based on one or both of a scale coefficient and a threshold coefficient that are determined based on the rankings.

18. The apparatus of claim 14, wherein the one or more processors are configured to:
determine rankings of the candidate output tokens of the first model based on the first probability;
extract target candidate output tokens for which the adjusting is to be performed from among the candidate output tokens based on the rankings; and
adjust the second probability corresponding to the extracted target candidate output tokens.

19. The apparatus of claim 18, wherein the one or more processors are configured to:
adjust the second probability corresponding to the extracted target candidate output tokens using a function determined based on the rankings.

20. The apparatus of claim 14, wherein the one or more processors are configured to:
normalize the adjusted second probability.

21. The apparatus of claim 20, wherein the one or more processors are configured to:
normalize the adjusted second probability such that a total sum of the adjusted second probability is 1.

22. The apparatus of claim 14, wherein the one or more processors are configured to:
perform a beam search to search the candidate output tokens for a preset number of candidate output tokens; and
normalize the adjusted second probability while performing the beam search.

23. The apparatus of claim 14, wherein the one or more processors are configured to:
calculate a weighted sum of the first probability and the adjusted second probability; and
determine, to be the output token, a candidate output token having a greatest weighted sum among the candidate output tokens.

24. The apparatus of claim 14, wherein a weight applied to the first probability is greater than a weight applied to the second probability.

25. The apparatus of claim 14, wherein the one or more processors are configured to:
predict the first probability based on an output token previously determined based on the first model and the second model; and
predict the second probability based on the output token previously determined based on the first model.

26. An apparatus comprising:
one or more processors configured to:
rank candidate tokens based on first probabilities of the candidate tokens;
determine a weight for each of the candidate tokens based on a ranking of each of the candidate tokens;

adjust second probabilities of the candidate tokens by weighting each of the second probabilities by the respective weight;

calculate a weighted sum for each of the candidate tokens based on the first probabilities and the adjusted second probabilities; and perform an inference operation including a speech recognition by outputting a candidate token having a largest weighted sum.

27. The apparatus of claim 26, wherein the one or more processors are configured to:

rank the candidate tokens by grouping the candidate tokens into two or more ranked groups based on the first probabilities of the candidate tokens; and determine a different weight for each of the ranked groups.

28. The apparatus of claim 26, wherein the one or more processors are configured to determine the weight for each of the candidate tokens such that a first candidate token, which has a higher first probability than a second candidate token, has a larger weight than the second candidate token.

29. The apparatus of claim 26, wherein the one or more processors are configured to determine the weight for each of the candidate tokens to be larger than one, one, or between zero and one based on the ranking of each of the candidate tokens.

30. The apparatus of claim 26, wherein the one or more processors are configured to rank the candidate tokens is descending from a candidate token having a highest first probability to a candidate token having a lowest first probability.

* * * * *